April 21, 1925.                                            1,534,358
F. A. BURNS
INTERNALLY ARMORED TIRE
Filed Feb. 24, 1923    2 Sheets-Sheet 1

Frank A. Burns.
INVENTOR

BY Victor J. Evans.
ATTORNEY

WITNESS:

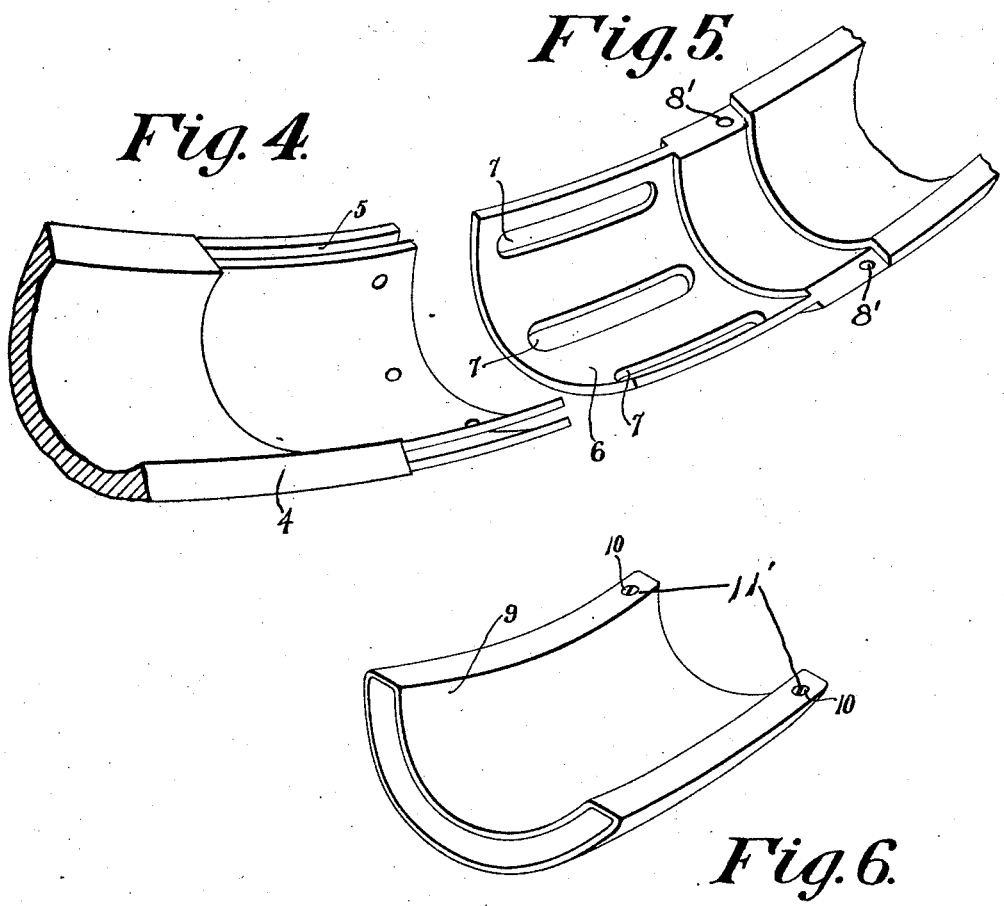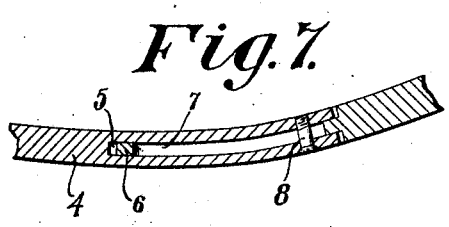

Patented Apr. 21, 1925.

1,534,358

UNITED STATES PATENT OFFICE.

FRANK A. BURNS, OF ANACONDA, MONTANA.

INTERNALLY-ARMORED TIRE.

Application filed February 24, 1923. Serial No. 621,064.

*To all whom it may concern:*

Be it known that I, FRANK A. BURNS, a citizen of the United States, residing at Anaconda, in the county of Deerlodge and State of Montana, have invented new and useful Improvements in Internally-Armored Tires, of which the following is a specification.

The object of this invention is to produce a casing for pneumatic tires that shall be puncture-proof.

A further object is to produce a casing for pneumatic tires having removably arranged on the inner face thereof a telescopic metal reinforcing member and having its side walls widened to form shoulders upon which the edges of the reinforcing member or ring rest, and whereby both the tread and side surfaces of the tire will be protected from punctures by sharp obstacles, etc.

A still further object is to produce a puncture-proof tire casing which shall be of a comparatively simple construction, which will accommodate the ordinary inflated tube and in which a telescopic tread reinforcing member is employed and is of such construction as to yield when influenced by an inflated tire and to practically telescope or collapse when the tire is deflated, such last mentioned arrangement of the member, however, not being great enough to allow the collapsing of the tire even when air is entirely let out of the tube.

To the attainment of the foregoing and other objects which will present themselves as the nature of the invention is better understood, reference is to be had to the drawings which accompany and which form part of this application.

In the drawings:—

Figures 4 and 5 are perspective views of the confronting ends of two sections of the metal reinforcement.

Figure 6 is a perspective view of the shield member that covers the confronting ends of the reinforcing sections.

Figure 7 is a fragmentary longitudinal sectional view of the device.

Figure 1:
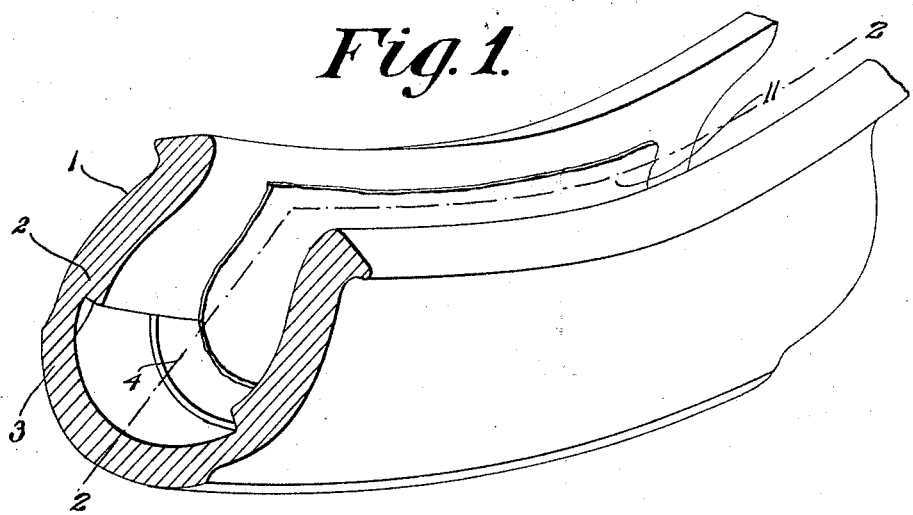
Figure 1 is a sectional perspective view of a tire casing in accordance with this invention.

In general appearance, the casing 1 is similar to that of the ordinary construction. However, in the process of manufacture, I reinforce the side walls of the casing by thickening the same, as indicated by the numeral 2. These thickened portions terminate in straight inner shoulders 3, the outer portions of the shoulders being rounded to the rim or beaded edge of the casing.

Arranged in the casing there is a telescopic metal reinforcement. The reinforcement may comprise any desired number of sections, all of which being of equal length, and all of which being arcuate in longitudinal section and transversely bowed. Each section is comparatively thin and is constructed of some light metal, such for instance as aluminum. Each section 4 is slotted from one of its ends to provide a longitudinal bifurcation 5, the said slot extending through the edges of the section. The opposite end of each section is reduced on both of its faces to provide a tongue 6, and the tongue of one section is designed to be received in the longitudinal bifurcation 5 of the adjacent section. Each tongue 6 has longitudinally arranged spaced slots 7 therethrough, and each section has passed through the pocket end thereof stop elements 8 that are received in the slots 7. The stop elements are preferably in the nature of short screws, the outer walls of the openings provided therefor being reamed to receive the heads of the said screws therein.

Figure 2:
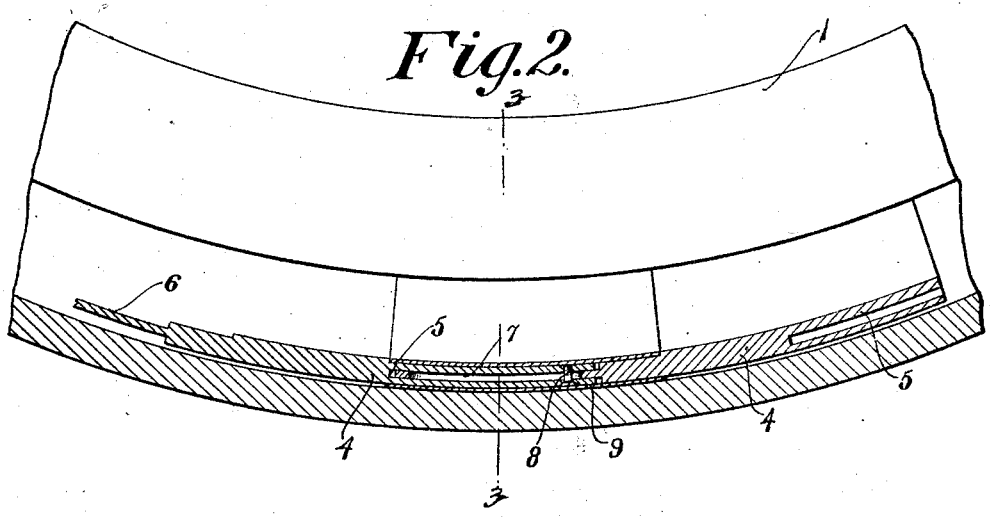
Figure 2 is a longitudinal sectional view approximately on the line 2—2 of Figure 1.
Figure 3:
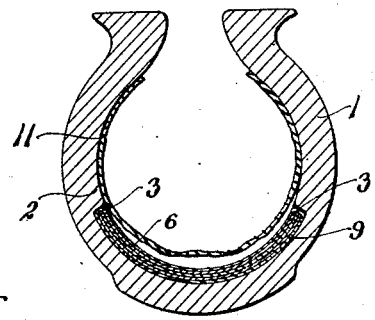
Figure 3 is a transverse sectional view on the line 3—3 of Figure 2.

Arranged over the joints of the sections there is a transversely bowed double walled hollow protector member 9, also formed of metal. The members 9 are comparatively thin and have their edges, adjacent their ends provided with openings 11' that align with threaded openings 8' in the ends of the sections 4, inward of the tongues 6, and through these openings 8' there are passed securing means, such as screws 10. As shown particularly in Figure 2, the inner faces of the protective members are flush with the inner faces of the plate sections.

When arranged in the tire, the telescopic reinforcing ring is in contacting engagement with the inner wall of the tread surface and with parts of the sides of the casing 1, the edges of the said reinforcing member resting on the shoulders 3 on the side walls 2 of the casing.

In order to protect the inner tube from contact with the telescopic reinforcing members and with the protecting members 9 at the joints at the confronting ends of said members, I secure on each of the sections 4, but not on the members 9, a continuous fabric sheet 11. Preferably the sheet 11 is secured to the tire by an adhesive material.

From the foregoing description, when taken in connection with the drawings, it will be noted that my improved tube is protected by the metallic reinforcing ring at the tread surface thereof and at the sides adjacent the tread surface, while the sides of the casing inward of the metallic protector are reinforced and rendered practically puncture-proof by the thickened portions 2 thereof. It will be further noted that the telescopic ring may be expanded or contracted, and that the sections thereof will be influenced outwardly with respect to each other by the inflation of a tube when arranged in the tire. It is to be further noted that the tongues and sockets are of such length and the stops 8 arranged in the slots 7 so that when the sections are fully telescoped, the said reinforcing members will support the tire to prevent the collapsing thereof even when all of the air is let out of the inner tube.

It is thought that the foregoing description, when taken in connection with the drawings, will fully set forth the construction and advantages of the improvement to those skilled in the art to which this invention relates, but it is to be understood that I do not wish myself restricted to the precise details of construction herein set forth, but hold myself entitled to all such changes therefrom as fall within the scope of the claims without departing from the spirit of the invention.

Having described the invention, I claim:—

The combination with a tire shoe, of a protector arranged therein and including a plurality of transversely bowed plate sections, each having one end provided with a longitudinal bifurcation, and its opposite end provided with a transversely bowed tongue which is slidably received in the bifurcation of the adjacent plate section, the tongues being provided with longitudinal slots, an element passing transversely through the bifurcated end and received in the slot whereby to limit the longitudinal movement of the plate sections in either direction, and transversely bowed double walled protective members slidably received on the sections and adapted to overlie the connected ends of the sections, the inner faces of the protective members being flush with the inner faces of the plate sections.

In testimony whereof I affix my signature.

FRANK A. BURNS.